No. 863,640. PATENTED AUG. 20, 1907.
N. M. POWELL.
FRICTION CLUTCH.
APPLICATION FILED DEC. 19, 1906.
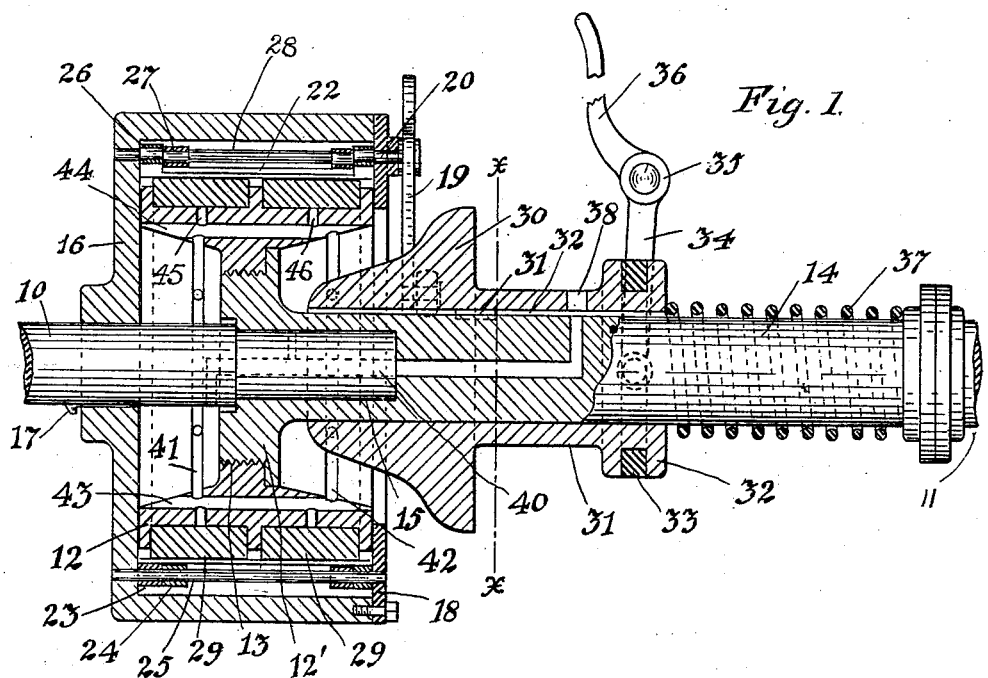
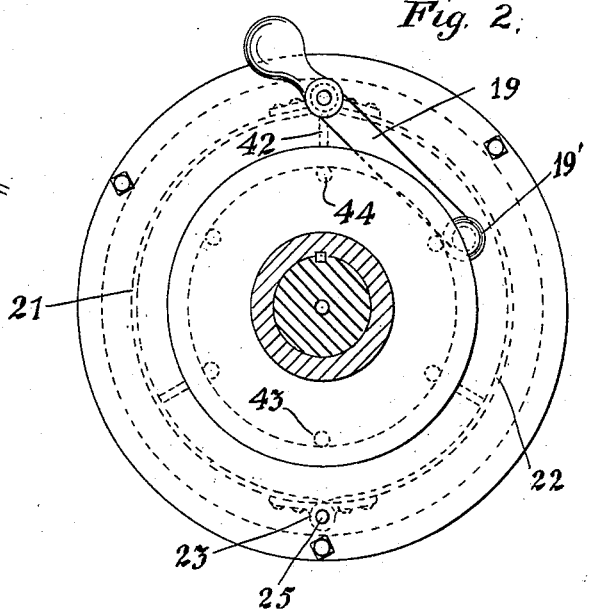
Witnesses
Wm Bodge
N. E. Miller
Inventor
Nicholas M. Powell
By his Attorney
Frank W. Ashley

UNITED STATES PATENT OFFICE.

NICHOLAS M. POWELL, OF NEW YORK, N. Y., ASSIGNOR OF ONE-HALF TO LEWIS G. YOUNG, OF NEW YORK, N. Y.

FRICTION-CLUTCH.

No. 863,640.   Specification of Letters Patent.   Patented Aug. 20, 1907.

Application filed December 19, 1906. Serial No. 348,511.

*To all whom it may concern:*

Be it known that I, NICHOLAS M. POWELL, a citizen of the United States, and residing at No. 1712 Fulton street, city of New York, in the borough of Brooklyn, county of Kings, State of New York, have invented certain new and useful Improvements in Friction-Clutches, of which the following is a specification.

The present invention relates to friction clutches and particularly to a type in which a drum coöperates with clamping members surrounding the same and adapted to be drawn tightly with respect to the drum to connect the driving part with the driven part.

The object of the invention is to provide a clutch of the character referred to which will be maintained engaged to transmit motion to the driven part irrespective of the direction in which the driving part is revolving, also provision whereby said clutch will be of simple construction and in which the wearing parts may be easily replaced by new parts at a very small expense, and also provide a novel form of clutch which may be attached to the part to be driven by means of the frictional surfaces of the clutch engaging gradually to drive the load while the driving means, such as a gas engine, is running at full speed, and to connect the driving means to the driven part so gradually that no shock or jar will result in starting the load from rest to full speed, such for example as starting a vehicle from a condition of rest to full speed without jar or excessive vibration.

My invention consists primarily in providing peculiarly conditioned clamping members which are adapted to coact with wearing sections interposed between said members and the friction surfaces of the drum, to hold said sections in place, the arrangement permitting the rotation of the motor to be reversed and the load still driven by the clutch.

In the accompanying drawing forming part of this specification:—Figure 1, is a central longitudinal sectional view, partly in elevation, of the clutch and means used to operate the same. Fig. 2, is a cross sectional view of the clutch, the plane of section being that indicated by the broken line X—X, Fig. 1. Fig. 3, is a detail view of one of the upper eye connections of the clamping members.

10 indicates the driving shaft, which we will assume to be the motor shaft, and 11 indicates the driven shaft which may be considered for present purposes, to be connected to the driven gear of an automobile.

12 designates the drum ring and 12′ the core piece thereof which is shown as being connected thereto by a screw thread 13, but may be connected in any other desirable manner, and after the parts are screwed together they are keyed to prevent their separation in a manner well known in the art.

Formed integral with the core piece 12′ is a shaft extension 14 which is provided with a recess at one end, into which one end of the shaft 10, projects, the surface forming the recess serving as a bearing for the end portion of the shaft.

Mounted on the shaft 10 is a casing 16, which is secured to the shaft by a key 17 as shown, said casing having secured at its open side an inwardly extending annular flange 18. This flange 18, supports a lever 19, and provides a bearing for a crank shaft 20, connected to and operable by said lever.

Approximately semi-circular clamping members 21, 22, surround the drum and are hinged at their lower ends through the medium of companion pairs of eyes 23, 24, to a rod 25, the ends of which are supported in recesses in the casing and flange respectively, said members at their upper ends having companion pairs of eyes 26, 27, the openings in which are slightly elongated. Both pairs of the upper eyes are engaged by a shaft 28, one end connected to the crank of the shaft 20, the other end bearing in the casing and providing contiguous thereto, a crank which coincides with the crank at the opposite side and which engages the member eyes adjacent to the closed end of the casing. The shaft 28 in conjunction with the shaft 20, presents a double throw crank shaft.

The wear sections 29, 29, interposed between the drum and the clamping members, and confined by the latter, are rectangular in cross section and may be in the form of split rings or curved segments. The periphery of the drum contains shallow parallel annular channels adapted to receive the major portions of the sections.

The lever 19, carries at its inner end a roller 19′, adapted to coöperate with a cam 30 mounted on the shaft extension 14, and held in relative position thereon by a feather or key 31, which is sunk into the shaft extension and engages with a key way 32 formed in the bore of the cam 30, thereby permitting said cam to reciprocate on but rotate with said shaft extension.

Connected to the cam 30, and formed integral with the same, is a sleeve 31, provided at its rear end with an enlargement 32 having a groove therein and loosely engaged within said groove, is a ring or bifurcated portion 33 at one end of a lever 34, which is pivoted at 35 to some suitable part and the upper end 36, of which lever permits the operation of the same by foot pressure serving to force the cam counter to the action of the spring 37, and so move said cam that the lever 19, will assume such position as will permit the relaxation of the clamping members 29, 29, and the disengagement of the wear sections from frictional contact with the drum. Such disengagement will be maintained as long as the foot pressure is exerted on the end 36, of the lever 34. It will thus be seen that the spring 37, normally keeps the cam 30, in such relation with the lever 19, that the clamping members are at the limit of their contracting capacity and the clutch held in engagement.

Located in the cam sleeve is an opening 38, which is in line with an opening in the shaft 14, drilled in said shaft and extending to the end of the shaft 10, the latter also centrally containing an opening 40, which leads to an opening within the core piece 12′, and serves to introduce oil into said core piece through radial grooves 41, 42, which grooves intersect drilled passages 43, 44, which communicate with passages 45, 46, leading to the faces of the wear sections, and thereby carrying oil through said passages to said sections by centrifugal action and acting to keep them in proper working condition. Manifestly, the arrangement of the hinged clamping members and the double crank throw connection afforded by the shaft at the upper ends thereof, will insure the clutch engagement being maintained, irrespective of the direction of rotation of the driving shaft.

A convenient manner of arranging for the connection of the upper eyes 26, 27, with the crank shaft, will be to form a part of each eye integral with its clamping member and complete said eye by a readily detachable keeper 26′, 27′, as illustrated in Fig. 3, the openings presented by said eyes being slightly elongated to compensate for the varying positions of the cranks.

The wear sections may be of soft metal, hard wood, leather, composition and in fact, any suitable material that will wear well in practice. Moreover, said sections being held in position by the clamping members, can be quickly removed and replaced by new ones in case of wear. The friction members 29 are free to slide entirely around the drum and also relative to the clamping members. The object of this construction is to allow a more gradual application of the engagement between the drum and the casing and to distribute the wear between the drum and the clamping members.

Obviously, by gradually applying or relaxing the foot pressure on the lever 34, the clutch will by reason of the character of the cam 30, gradually engage or disengage the clutch.

The form and number of the wear sections may be changed and, as previously intimated, they may be divided into more or less length of section as the service may require without departing from the invention, and I therefore do not wish to limit myself to the exact construction disclosed herein, but reserve to myself all forms that come fairly within the scope of my invention.

Having now described my invention, what I claim as new and desire to secure by Letters Patent, is—

1. A clutch comprising a casing, a drum in said casing provided with a shaft which extends beyond one end thereof, a friction section external to said drum, clamping members hinged at one end and external to said section and drum, said friction section being movable circumferentially on said drum and relative to said clamping members, a crank connecting said members at their opposite ends, and provision whereby the crank can be moved to either contract or relax the clamping members to cause the friction section to engage or become disengaged respectively from said drum.

2. A clutch comprising a casing, a drum in said casing provided with a shaft which extends beyond one end thereof, a friction section external to said drum, clamping members hinged at one end external to said section and drum, said friction section being movable circumferentially on said drum and relative to said clamping members, a crank connecting said members at their opposite ends, and provision whereby the crank can be moved to either quickly or gradually contract or relax the clamping members to cause the friction section to engage or become disengaged respectively, from said drum.

3. A clutch comprising a casing a drum in said casing provided with a shaft which extends beyond one end thereof, a friction section external to said drum, clamping members hinged at one end, a double throw crank shaft connecting said members at their opposite ends, and provision for operating the crank to either contract or relax the clamping members to cause the friction section to engage or become disengaged respectively from said drum, the arrangement being such that the clutch will be maintained engaged irrespective of the direction of rotation of a driving part.

4. A clutch comprising a casing, a drum in said casing provided with a shaft which extends beyond one end thereof, a friction section external to said drum, clamping members hinged at one end, a double throw crank shaft connecting said members at their opposite ends, a lever connected to said crank shaft, a longitudinally tapering cam sliding on but revoluble with said drum shaft, the lever being in bearing relation with respect to the cam, said cam being normally spring projected to hold the lever so that the clutch will be engaged, and means for shifting the cam counter to the action of the spring to relax the lever and disengage the clutch.

5. A clutch comprising a casing, a drum in said casing provided with a shaft which extends beyond one end thereof, independent friction sections in depressions in the drum periphery, clamping members hinged at one end, a double throw crank shaft connecting said members at their opposite ends, a lever connected to said crank-shaft, a longitudinally tapering cam sliding on but revoluble with said drum shaft, the lever being in bearing relation with respect to the cam, said cam having a sleeve and normally spring projected to hold the lever so that the clutch will be engaged, and means for shifting the cam counter to the action of the spring; the cam sleeve having an exteriorly opening passage registering with the branch of a passage centrally within the drum shaft and feeding passages within the drum leading to the frictions, whereby the latter will be lubricated by centrifugal action.

In testimony whereof, I, NICHOLAS M. POWELL have signed my name to this specification in the presence of two subscribing witnesses, this 6th day of December 1906.

NICHOLAS M. POWELL.

Witnesses:
 AMELIA BLAUVELT,
 N. C. MILLER.